United States Patent [19]

Voeten et al.

[11] Patent Number: 5,347,635
[45] Date of Patent: Sep. 13, 1994

[54] ENCODER ARRANGEMENT HAVING PREVENTIVE POLICING CIRCUIT (PPC) WITH STATISTICAL MEASUREMENT CIRCUIT (SMC) AND DATA OUTPUT RATE REDUCTION CIRCUIT (CRRC)

[75] Inventors: Bart F. Voeten, Beerse; Willem J. A. Verbiest, St. Gillis Waas, both of Belgium

[73] Assignee: Alcatel N.V., Amsterdam, Netherlands

[21] Appl. No.: 936,133

[22] Filed: Aug. 27, 1992

[30] Foreign Application Priority Data

Aug. 28, 1991 [EP] European Pat. Off. ......... 91202188.8

[51] Int. Cl.$^5$ ............................................. G06F 13/14
[52] U.S. Cl. .................................................. 395/250
[58] Field of Search .................. 395/250, 425; 364/200

[56] References Cited

U.S. PATENT DOCUMENTS

| | | | |
|---|---|---|---|
| 4,779,267 | 10/1988 | Limb | 370/94 |
| 4,920,534 | 4/1990 | Adelmann et al. | 370/94.1 |
| 5,134,476 | 7/1992 | Aravind et al. | 358/133 |
| 5,159,447 | 10/1992 | Hoskell et al. | 358/133 |
| 5,237,660 | 8/1993 | Weber et al. | 395/250 |

FOREIGN PATENT DOCUMENTS

| | | |
|---|---|---|
| 0441168 | 8/1991 | European Pat. Off. |
| WO005416 | 5/1990 | PCT Int'l Appl. |

OTHER PUBLICATIONS

"Definition of a Universal ATM Video Coding Architecture" by W. Verbiest, et al, VISICOM 90, Workshop on Packet Video in Morristown, USA.
Electrical Communication. vol. 64, No. 2/3. 1990, Brussels BE pp. 186, 193; S. D'Agostino et al.: 'Universal ATM Video Coding Architecture', p. 188, right column, line 3–p. 189, left column, line 29; FIG.2*, *p. 191, left column, line 40–p. 192, right column, line 11; FIG. 5*.

Primary Examiner—Dale M. Shaw
Assistant Examiner—Moustafa M. Meky

[57] ABSTRACT

Encoder arrangement including the cascade connection of a data source (VSS), an encoder circuit (ENC) and a buffer circuit (BUFC) which is part of a preventive policing circuit (PPC) adapted to reduce the data output rate of said buffer circuit when said output rate does not satisfy a predetermined probability distribution function (CCCP/CR) of said output rate. The PPC at the end of each measurement interval measures this data output rate, determines the interval (BRI) to which the measured data output rate belongs and generates an alarm signal (AL). Via a gating arrangement (AG, GC) the alarm signal controls the connection of a clock signal (CLO/3) with a reduced output rate to the readout input (RO) of the buffer circuit (BUFC) when for the measured interval the cell rate has to be decreased.

13 Claims, 4 Drawing Sheets

_5,347,635_

ENCODER ARRANGEMENT HAVING PREVENTIVE POLICING CIRCUIT (PPC) WITH STATISTICAL MEASUREMENT CIRCUIT (SMC) AND DATA OUTPUT RATE REDUCTION CIRCUIT (CRRC)

TECHNICAL FIELD

The present invention relates to an encoder arrangement including the cascade connection of a data source, an encoder circuit and a buffer circuit which is part of a preventive policing circuit adapted to reduce the data output rate of said buffer circuit when said output rate does not satisfy a predetermined probability distribution function of said output rate.

BACKGROUND OF THE INVENTION

Such an encoder arrangement is already known in the art, e.g. from the article "Definition of a Universal ATM Video Coding Architecture" by W. Verbiest et el, published in VISICOM 90, Workshop on Packet Video in Morristown, USA.

Therein the preventive policing circuit which is provided in a terminal of a switching network is only represented schematically and its operation is not described in detail.

OBJECT OF THE INVENTION

An object of the present invention is to provide an encoder arrangement of the above type wherein the preventive policing circuit performs its function in a very efficient way.

SUMMARY OF THE INVENTION

According to the invention this object is achieved due to the fact that said preventive policing circuit includes a statistical measurement circuit which is coupled to the data output of said encoder circuit and which, at the end of each measurement interval, measures the data output rate for said measurement interval, generates an interval signal indicative of the one of a plurality of consecutive data output data intervals to which the data output rate thus measured belongs and also generates for this interval an alarm signal indicative of the fact that the data output rate of said buffer circuit has to be temporarily decreased or not during the next following measurement interval, and that said policing circuit further includes a data output rate reduction circuit which is controlled by said alarm signal and controls a read-out input of said buffer circuit.

Because the policing function monitors the buffer data output rate in a like way for any of the measured data output rates belonging to a same data output rate interval, the preventive policing circuit has a relatively simple structure and operates very efficiently.

It should be noted that a statistical measurement circuit as defined above is known per se from the published European patent application No 0396562 (P. Joos et al 2-4), hereafter called first publication which corresponds to U.S. Pat. No. 5,179,549. However, therein it is used at the input of a switching network as part of a repressive policing circuit, i.e. one which discards data when the probability distribution function is not satisfied.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
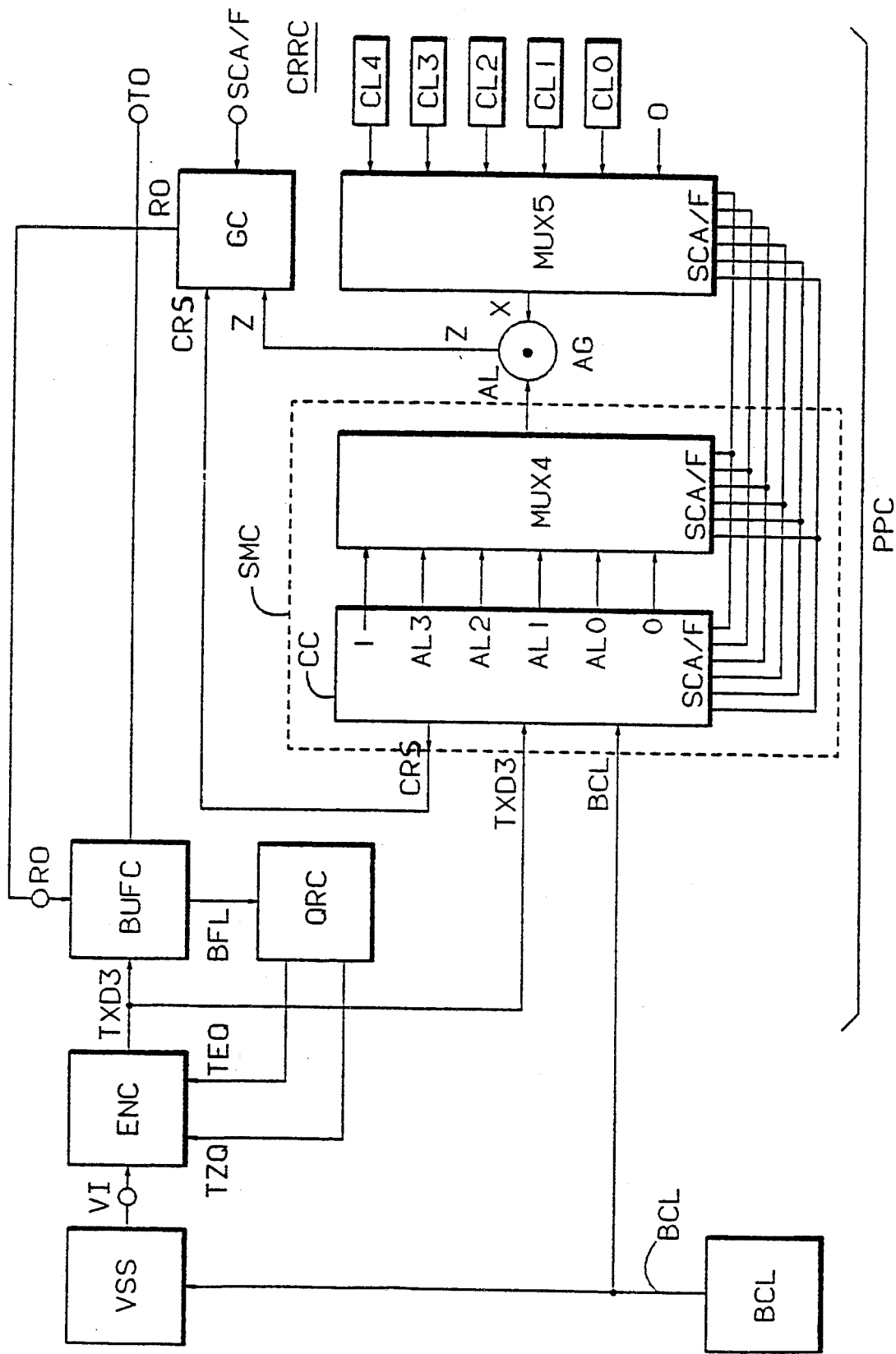
FIG. 1 is a schematic diagram of an encoder arrangement according to the invention.

Principally referring to FIG. 1 the encoder arrangement shown therein is part of a transmitter of a subscriber station of an image processing system including a switching network (not shown) to which a plurality of such subscriber stations have access. Information is generated by this encoder arrangement in an asynchronous way under the form of packets of fixed length, called cells.

The encoder arrangement includes the cascade connection of a video source VSS which is controlled from a bit clock BCL, an encoder circuit ENC and a buffer circuit BUFC which is part of a preventive policing circuit PPC and has an output TO.

The video source VSS and the encoder circuit ENC are of the type disclosed in the published European patent application No 89911047.2 (W. Verbiest at al 5-1-1), hereafter called second publication. VSS generates at its data output VI a video signal which is constituted by a stream of multiplexed luminance and chrominance 8-bit data words at a rate of 27 Megawords per second, each word representing the digital value of a luminance or chrominance analog sample of an image or picture element (pixel). The successive data words of the stream relate to successive pixels of successive lines of each image.

In the encoder circuit ENC the latter data words provided at the output VI of VSS are encoded and packetized, together with signaling data, and then supplied to the buffer circuit BUFC of the preventive policing circuit PPC via data output TXD3 and under the form of cells of data.

The preventive policing circuit PPC includes next to the buffer circuit BUFC, a statistical measurement circuit SMC, a cell rate reduction circuit CRRC and a quality regulation circuit QRC. CRRC comprises a multiplexer MUX5, a plurality of clock units CL0/4, and a gating arrangement comprising AND-gate AG and gating circuit GC.

The statistical measurement circuit SMC is of the type disclosed in the above mentioned first publication, but it is of a less complex structure as the cells supplied to it all belong to a same communication. SMC is only represented in a very schematic way as comprising a general control circuit CC with a cell input TXD3 and a clock input BCL connected to the like named outputs of ENC and BCL respectively. The control circuit CC also has a cell rate output CRS, an interval signal output SCA/F (which is indicated by SC in the first publication) and alarm outputs O, ALO/3 and 1 which constitute the data inputs of this multiplexer MUX4, whereas the interval signal output SCA/F is connected to the selection input thereof. The output AL of MUX4 is connected to one input of AND-gate AG whose second input is constituted by the output X of the multiplexer MUX5. The data inputs of the latter multiplexer MUX5 are constituted by 0 and the outputs of the clock units CL0/4, whilst its selection input is also constituted by SCA/F. The output Z of AG and the outputs CR1 and SCA/F of CC are connected to the read-out input RO of the buffer circuit BUFC via the gating circuit GC.

The buffer circuit BUFC also has a buffer filling level output BFL which controls the encoder quality regulation circuit QRC. The latter has two quality control outputs TEQ and TZQ which are connected to like named inputs of the encoder circuit ENC. BUFC, QRC and ENC are connected in an output rate regulating loop for BUFC.

Figure 2:
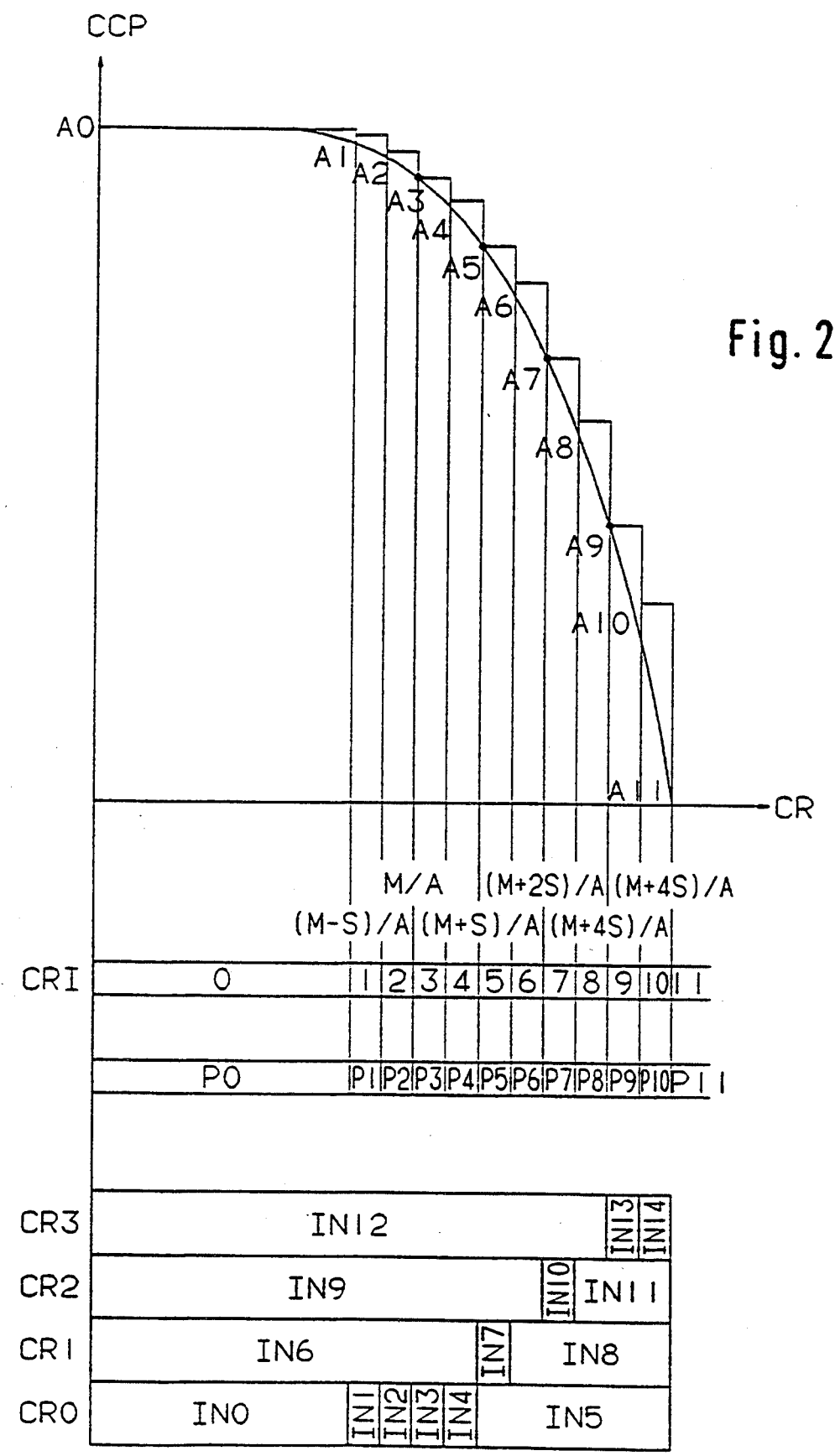
FIG. 2 represents a complementary cumulative Gaussian probability distribution function of a variable cell rate, and a staircase approximation thereof, to illustrate the operation of the encoder arrangement of FIG. 1.
Figure 3:
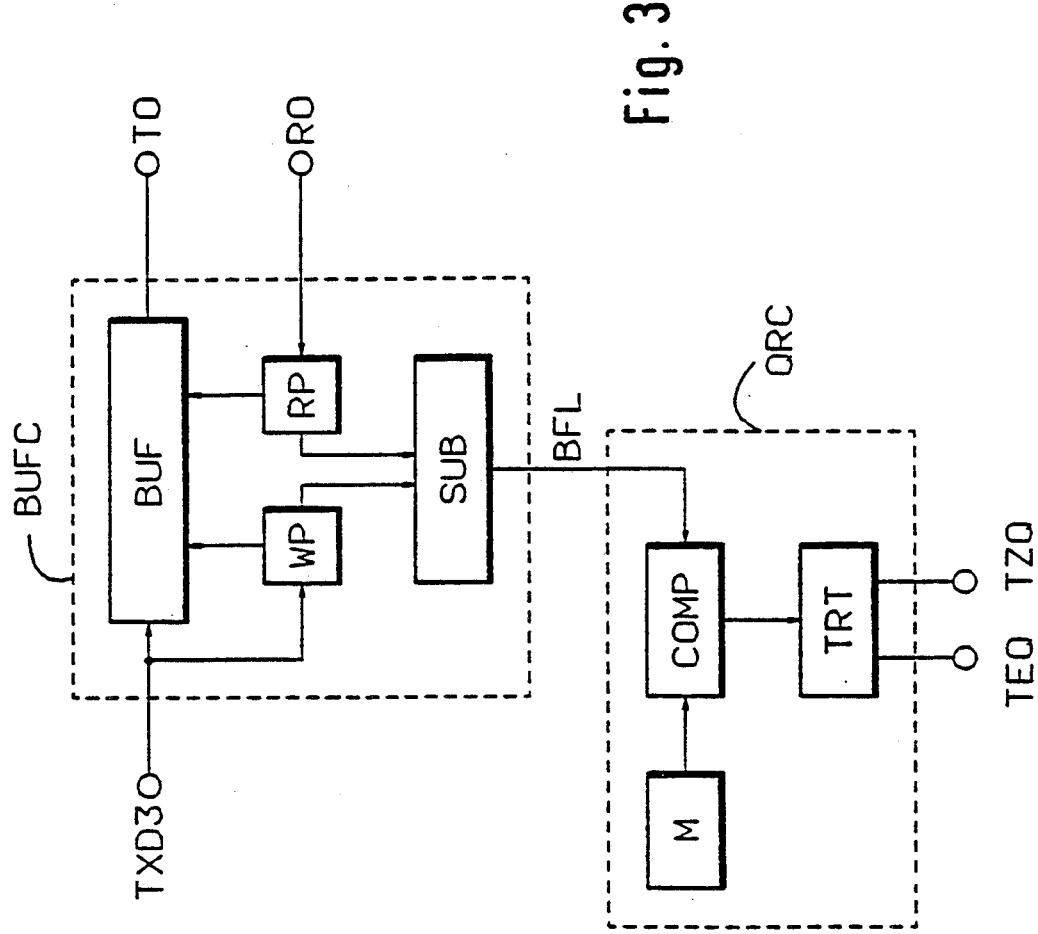
FIG. 3 is a more detailed circuit of the circuits BUFC and QRC both schematically shown in FIG. 1.
Figure 4:
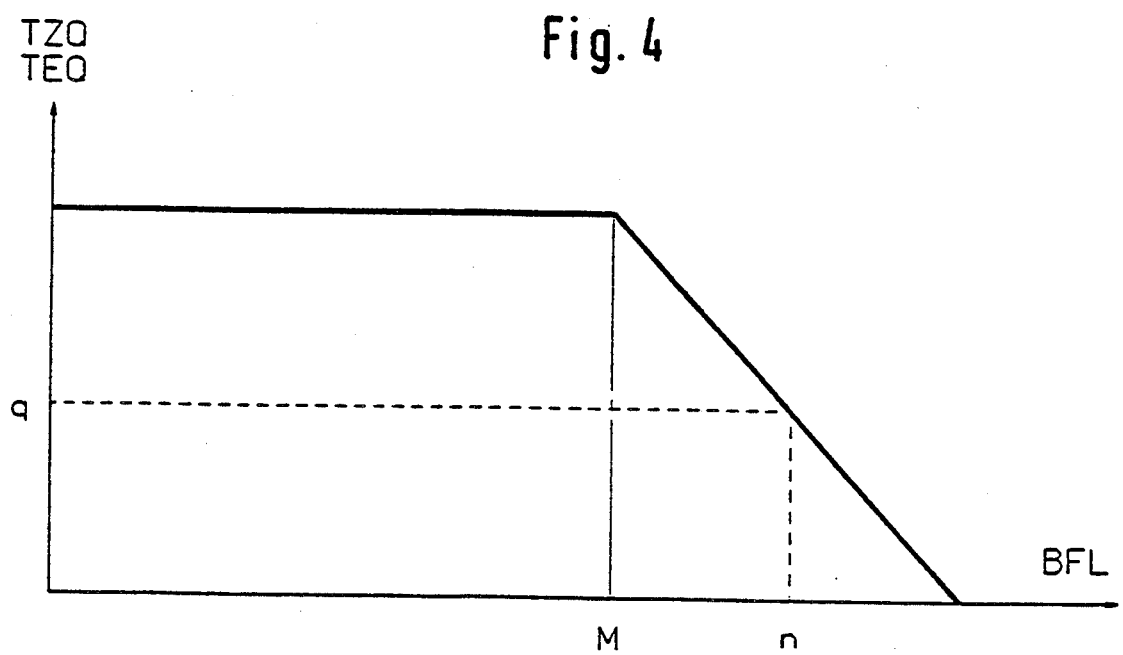
FIG. 4 is a diagram to explain the operation of the circuit QRC.

Before describing the operation of the preventive policing circuit PPC of FIG. 1 reference is made to FIG. 2 which is identical to FIG. 4 of the above mentioned first publication.

This figure represents on the abscissa the cell rate value CR and on the ordinate (on a logarithmic scale) the Gaussian probability CCP to exceed this cell rate value. This function is therefore called the complementary (with respect to 1) cumulative Gaussian probability distribution function of the cell rate. It is derived from a Gaussian probability distribution function with mean $m=M/A$ and standard deviation $s=S/A$, wherein:

A is the (selectable) duration of a measurement interval;

M is a number of cells such that the expected value of the mean m of the above probability distribution curve is equal to M/A;

S is a number of cells such that the expected value of the standard deviation of this curve is equal to S/A.

FIG. 2 also a represents a staircase function comprising the points A0 to A11 and approximating the curve CCP versus CR. For these points the cell rates are equal to 0, (M−S)/A, (M−S/2)/A, ..., (M+4S)/A respectively, whilst the corresponding complementary cumulative probabilities are PA0=1, PA1, PA2, ..., PA10, PA11=0 (not shown) respectively. Also represented in FIG. 2 are the cell rate intervals CRI0, CRI1, ..., CRI11 delimited by the last mentioned cell rates. The probabilities of the cell rates to be in these intervals CRI0 to CRI11 are P0 to P11, defined as follows:

$$P0 = P(0 =< CR =< (M − S)/A)$$
$$P1 = P[(M − S)/A < CR =< (M − S/2)/A]$$
.
.
$$P10 = P[(M + 7S/2)/A < CR =< (M + 4S)/A]$$
$$P11 = P[(CR > (M + 4S)/A] = 0$$

The above complementary cumulative probability values PA0 to PA11 may therefore be written $$PA0 = 1$$
$$PA1 = P1+P2+P3+P4+P5+P6+P7+P8+P9+P10$$
$$PA2 = P2+P3+P4+P5+P6+P7+P8+P9+P10$$
$$PA3 = P3+P4+P5+P6+P7+P8+P9+P10$$
.
.
$$PA5 = P5+P6+P7+P8+P9+P10$$

-continued $$PA7 = P7+P8+P9+P10$$
.
.
$$PA9 = P9+P10$$
$$PA10 = P10$$
$$PA11 = 0$$

The statistical measurement circuit SMC is able to monitor the above staircase approximation A0 to A11 of the complementary cumulative probability distribution curve CCP versus CR, represented in FIG. 2, by using four counters CRO/3 (not shown in detail). These counters are more particularly used to monitor the probabilities in the points A1, A2, A3, A4; A5, A6; A7, A8; and A0, A10 respectively and this is possible due to a suitable choice of corresponding increment values IN0/5, IN6/8, IN9/11 and IN12/14 respectively, as explained in the above mentioned first publication. The operation of SMC is briefly described hereafter.

At the receipt of a last cell within a measurement time interval the SMC determines the cell rate value, the total number of cells received within this time interval and derives therefrom the cell rate interval among CRI0/11 to which this cell belongs and subsequently decrements/increments the counters CRO/3 with corresponding decrement/increment values allocated to this cell rate interval. By proceeding in this way the resultant contents of these counters CRO/3 at the end of a measurement interval are indicative of the deviation, during the measurement interval, of the probabilities from their expected values in the points A1/4; A5/6; A7/8; and A9/10 respectively. More particularly, when these expected probabilities are exceeded corresponding ones of the above mentioned alarm outputs ALO/3 are activated.

The SMC also determines the cell rate interval CRI0/2; 3/4; 7/8; 9/19 or 11 to which the measured cell rate value belongs and accordingly activates the corresponding interval signal SCA, SCB, SCC, SCD, SCE or SCF respectively. Depending on the one of these SCA/F signals which is activated the multiplexer MUX4 then applies the corresponding one of the alarm signals 0, AL0, AL1, AL2, AL3, 1 to its alarm output AL.

In the above mentioned first publication the output signal AL of MUX4 is used to control the dropping of cells in order that the approximation of the expected probability function should be satisfied. On the contrary, the above preventive policing circuit PPC ensures that this function is satisfied by adjusting—if necessary—the rate at which cells are read out from the buffer circuit BUFC under the control of the cell rate signal CRS. The latter signal is the same as the signal normally used by the encoder circuit ENC to write the cells in BUFC. This will become clear from the following.

Because the interval signal SCA/F also controls the selection input of the multiplexer MUX5, it is clear that when one of the cell rate intervals CRI0/2; 3/4; 5/6; 7/8; 9/10; 11 has been determined the value 0 or the output of CL0, CL1, CL2, CL3, CL4 is then connected to the output X of MUX5 respectively. Because simultaneously a respective one of the alarm outputs 0, AL0, AL1, AL2, AL3, 1 is then connected to the output AL of MUX4, the gating signal Z at the output Z of AND-gate AG may be represented by the Boolean function:

$$Z = SCB \cdot ALO \cdot CLO + SCC \cdot AL1 \cdot CL1 + SC\text{-}D \cdot AL2 \cdot CL2 + SCE \cdot AL3 \cdot CL3 + SCF \cdot CL4 \quad (1)$$

This gating signal Z is applied together with the cell rate signal CRS and the interval signal SCA/F to the obvious gating circuit GC which generates a read-out signal RO that may be represented by the Boolean function:

$$RO = \overline{CRS}(SCA + SCB \cdot \overline{ALO} + SCC \cdot \overline{AL1} + SC\text{-}D \cdot \overline{AL2} + SCE \cdot \overline{AL3}) + Z \quad (2)$$

Taking the relation (1) into account the relation (2) may be written:

$$RO = SCA \cdot CRS + SCB(\overline{ALO} \cdot CRS + ALO \cdot CLO) + SCC(\overline{AL1} \cdot CRS + AL1 \cdot CL) + SC\text{-}D(\overline{AL2} \cdot CRS + AL2 \cdot CL2) + SCE(\overline{AL3} \cdot CRS + AL3 \cdot CL3) + SCF \cdot CL4$$

From this relation it follows that
when the cell interval CRI is 0, 1,2 (only SCA being then 1) the cell rate signal CRS is applied to RO of BUFC since RO=CL4;
when the cell interval CRI is 11 (only SCF being then 1) the clock signal CLA is applied to RO of BUFC since RO=CL4;
when the cell interval CRI is one of the other intervals (one of CSCB/E being then 1), CRS or a clock signal CLO/3 is applied to RO depending on ALO/3 being de-activated or activated respectively.
Indeed, when for instance SCB=1 (meaning that CRI3/4 has been determined) then $$RO = \overline{ALO} \cdot CRS + ALO \cdot CL0.$$

The clock signals CL0, CL1, CL2 and CL3 have a rate somewhat smaller than M/A (M+S)/A, (M+2S)/A, (H+3S)/A, whereas CL4 has a rate equal to (M+S)/A, the latter rate values being the lowest ones of the corresponding cell rate intervals CRI3/4, 5/6, 7/8, 9/10 and 11 respectively.

From the above it follows that when at the end of measurement interval the cell rate interval is found to 0/2 then the read-out rate of BUFC is not adjusted but maintained equal to CRS and the same is true when the cell rate interval is 3/4, 5/6, 7/8 or 9/10 and the corresponding alarm output is de-activated. On the contrary, when the cell rate interval is 3/4, 5/6, 7/8 or 9/10 and the corresponding alarm output AL0, AL1, AL2, AL3 is activated then the cell rate signal CRS is not used and the read-out rate of BUFC is decreased to a value smaller than the lowest cell rate value for that interval. Finally, when the cell rate interval is found to be 11, then the cell rate CRS is made equal to the lower cell rate value for that interval.

By decreasing or limiting the cell read-out rate CRS of the buffer circuit BUFC in the way described above, it is clear that the cell rate at the output TO of this buffer circuit is monitored so as to remain below the staircase approximation of the probability curve of FIG. 2.

But due to the fact that the read-out rate of the buffer circuit BUFC is reduced, the number of cells being stored in this buffer would gradually increase and would reach an unacceptable value if no measures were taken. These measures comprise the use of a regulating feedback loop including the buffer circuit BUFC, the encoder circuit ENC and the quality regulating circuit QRC.

This regulating loop is now described in more detail by making reference to FIG. 5 which shows BUFC and CRC in more detail. BUFC comprises a buffer circuit BUF with a data input TXDS and a data output TO, a read pointer RP controlled by the read-out input RO and a write pointer WP connected to TXD3. RP and WP control the reading and writing of cells from and in the buffer BUF and have further outputs connected to a subtracter circuit SUB for calculating the difference BFL of the contents of WP and RP. This difference constitutes the buffer filing level BFL and is provided at the like named output BFL of BUFC.

The latter output BFL of BUFC is connected to an input of a comparator COMP which forms part of the quality regulating circuit QRC. The other input of COMP is connected to the output of a memory circuit M storing predetermined buffer level filling value N and the output of the comparator COMP is connected to an obvious regulating circuit TRT which provides at its outputs quality parameters TEQ and TZQ. These parameters are functions of the buffer filling level BFC and are applied to the like named inputs of QRC. Their function is explained in the above mentioned second publication. When the calculated buffer filling level BFL is below the value M, the value of the parameters TEQ and TZQ is not changed. On the contrary, when BFL exceeds the predetermined value N and is for instance equal to n, the comparator COMP provides an output signal which is indicative of this difference and which is used by the circuit TRT to calculate a lower value q for the parameters TEQ and TZQ, as represented in FIG. 4. When these lower value parameters are applied to the encoder ENC, the latter decreases its operation quality and this results in a decrease of the output rate of the cells generated at its output TXD3 and obviously in a decrease of the buffer filling level. Thus a cell rate output regulating function is realized.

While the principles of tile invention have been described above in connection with specific apparatus, is to be clearly understood that this description is made only by way of example and not as a limitation on the scope of the invention.

We claim:
1. Encoder arrangement, comprising:
a data source (VSS) for providing data signals (VI);
an encoder circuit (ENC), responsive to the data signals (VI), for providing data output signals (TXD3) at a buffer input data rate;
a buffer circuit (BUFC), responsive to the data output signals (TXD3), and further responsive to a read-out input signal (RO), for providing buffer output data at a buffer output data rate to an output $T_o$; and
a preventive policing circuit (PPC) for controlling the buffer output data rate as a function of a predetermined probability distribution function (CCCP/CR), having a statistical measurement circuit (SMC) and a data output rate reduction circuit (CRRC),
the statistical measurement circuit (SMC) being responsive to the data output signals (TXD3), for measuring the buffer input data rate at the end of each measurement interval, for providing inter- val signals (SCA/F) indicative of one of a plurality of consecutive data output rate intervals (BRI0/2, 3/4, 5/6, 7/8, 9/10, 11) corresponding to the buffer input data rate for each measurement interval, for also providing a data output rate signal (CRS), and for further providing an alarm signal (AL:O/ALO/3, 1) to indicate whether the data output rate signal (CRS) has to be temporarily decreased during a following measurement interval, and the data output rate reduction circuit (CRRC) being responsive to the interval signals (SCA/F), also being responsive to the alarm signal (A:0-/AL0/3, 1) and further being responsive to the data output rate signal (CRS), for providing the readout input signal (RO) to said buffer circuit (BUFC) for reducing the buffer output data rate of the buffer output data from said buffer circuit (BUFC) to the output $T_o$ in the following measurement interval.

2. Encoder arrangement according to claim 1, characterized in that said alarm signal (ALO/3) indicates whether said probability distribution function is satisfied for each of the measurement intervals, except for a first (BRIO/2) and last (BRI11) measurement interval.

3. Encoder arrangement according to claim 2, characterized in that a lowest data output rate $(0;(M+4S)/A)$ of said first (BRIO/2) measurement interval has an expected probability that equals 1 and said alarm signal (AL) has a value indicating that the data output rate signal (CRS) of said buffer circuit (BUFC) never has to be decreased at the end of its respective measurement interval; and a lowest data output rate $(0;(M+4S)/A)$ of said last (BRI11) measurement interval has an expected probability that equals 0 and said alarm signal (AL) has a value indicating that the data output rate signal (CRS) of said buffer circuit (BUFC) always has to be decreased at the end of its respective measurement interval.

4. Encoder arrangement according to claim 3, characterized in that said data output rate reduction circuit (CRRC) has a plurality of clock units (CL0–CL4) for providing corresponding clock signals (CL0/4), and responsive to said alarm signal (AL) and said interval signal (SCA/F) for each of said measurement intervals, except the first interval (BRIO/2), said data output rate reduction circuit (CRRC) provides a corresponding clock signal to said buffer circuit read-out input (RO) when said alarm signal (AL) is activated.

5. Encoder arrangement according to claim 4, characterized in that each clock signal (CLO/3) for of a respective measurement interval, except for the last one (BRI11), has a corresponding rate that is smaller than the lowest output rate $(M/A, (M+S)/A, (M+2S)/A, (M+3S)/A)$ of the respective measurement interval.

6. Encoder arrangement according to claim 4, characterized in that the clock signal (CLO4) for said last measurement interval (BRI11) has a corresponding clock rate equal to the lowest output rate $(M+4S)/A)$ of the respective measurement interval.

7. Encoder arrangement according to claim 1, characterized in that said statistical measurement circuit (SMC) includes a control circuit (CC) and a first multiplexer (MUX4) having data inputs for receiving respective alarm signals (0, ALO/3, 1) from the control circuit (CC) for said respective measurement intervals, said first multiplexer has a selection input controlled by said interval signal (SCA/F) and an alarm output (AL) for providing said respective alarm signals (0, ALO/3, 1).

8. Encoder arrangement according to claim 7, characterized in that said data output rate reduction circuit (CRRC) includes a second multiplexer (MUX5) having data inputs responsive to the logical value 0 for said first measurement interval and responsive to said clock signals (CLO/4) for the other measurement intervals, and having a selection input responsive to said interval signal (SCA/F) and an output (X) which is coupled to said read-out input (RO) of said buffer circuit (BUFC) through a gating means (AG, GC) controlled by said alarm signal (AL).

9. Encoder arrangement according to claim 8, characterized in that said gating means (AG, GC) includes an AND-gate (AG) responsive to the output (AL) of said first (MUX4) and the output (X) of said second (MUX5) multiplexers and includes an output (Z) for providing an output signal (Z) which controls a gating circuit (GC), and further includes a gating circuit (GC) responsive to said interval signal (SCA/F) and by said data output rate signal (CRS), said gating circuit (GC) generating a read out signal (RO) represented by the Boolean function:

$$RO = CRS(SCA + SCB \cdot ALO + SCC \cdot AL1 + SC \cdot D \cdot AL2 + SCE \cdot AL3) + Z$$

wherein the signal Z provided at the output of said AND-gate (AG) may be represented by the Boolean function:

$$Z = SCB \cdot ALO \cdot CLO + SCC \cdot AL1 \cdot CL1 + SC \cdot D \cdot AL2 \cdot CL2 + SCE \cdot AL3 \cdot CL3 + SCF \cdot CL4.$$

10. Encoder arrangement according to claim 1, characterized in that said probability distribution function of the data output rate signal (CRS) is the staircase approximation of a complementary cumulative probability distribution.

11. Encoder arrangement according to claim 1, characterized in that said data output signals (TXD3) generated by said encoder circuit (ENC) are grouped in cells of fixed length and that said data output rate signal (CRS) is a cell output rate.

12. Encoder arrangement according to claim 1, characterized in that the encoder arrangement further includes an encoder quality regulating circuit responsive to a buffer fill signal (BFL) from said buffer circuit (BUFC), for providing quality parameters (TEQ, TZQ), which together form a buffer output rate regulating loop for determining a predetermined quality of encoding of said encoder circuit (ENC) as a function of the filling level signal (BFL) of said buffer circuit (BUFC).

13. Encoder arrangement according to claim 12, characterized in that said buffer circuit (BUFC) includes a buffer (BUF) and measuring means (SUB) to measure the filling level of said buffer (BUF) and provide the fill level signal (BFL) to said quality regulating circuit (QRC), said quality regulating circuit (QRC) reducing the predetermined quality of said encoder circuit (ENC) when said buffer filling level exceeds a predetermined value (M).

\* \* \* \* \*